(12) United States Patent
Hidrot et al.

(10) Patent No.: US 8,372,901 B2
(45) Date of Patent: Feb. 12, 2013

(54) TYRE TREAD HAVING A COMPOSITION CONTAINING A XANTHAN GUM POWDER

(75) Inventors: Jean-Denis Hidrot, Chamalieres (FR); Salvatore Pagano, Ota (JP)

(73) Assignee: Michelin Recherche et Technique S.A., Granges-Paccot (CH)

( * ) Notice: Subject to any disclaimer, the term of this patent is extended or adjusted under 35 U.S.C. 154(b) by 460 days.

(21) Appl. No.: 12/521,482

(22) PCT Filed: Dec. 6, 2007

(86) PCT No.: PCT/EP2007/063397
§ 371 (c)(1),
(2), (4) Date: Sep. 11, 2009

(87) PCT Pub. No.: WO2008/080751
PCT Pub. Date: Jul. 10, 2008

(65) Prior Publication Data
US 2010/0069530 A1 Mar. 18, 2010

(30) Foreign Application Priority Data
Dec. 27, 2006 (FR) ...................................... 06 11509

(51) Int. Cl.
*A61K 8/73* (2006.01)
*C08J 5/14* (2006.01)

(52) U.S. Cl. .......................................... 524/55; 523/157
(58) Field of Classification Search .................. 523/157; 524/55
See application file for complete search history.

(56) References Cited

U.S. PATENT DOCUMENTS

| | | | |
|---|---|---|---|
| 4,722,954 A * | 2/1988 | Hallworth ........................ | 524/55 |
| 5,196,263 A * | 3/1993 | Melby et al. ..................... | 428/327 |
| 5,234,988 A * | 8/1993 | Brooks et al. ................... | 524/526 |
| 5,371,136 A * | 12/1994 | Brooks et al. ................... | 524/526 |
| 5,464,586 A * | 11/1995 | Wagner .......................... | 264/130 |
| 5,496,298 A * | 3/1996 | Kuepper et al. ................. | 604/389 |
| 5,547,712 A * | 8/1996 | Gossen et al. ................. | 427/427.5 |
| 5,837,762 A * | 11/1998 | Stollmaier et al. ............. | 524/274 |
| 5,853,461 A * | 12/1998 | Wagner .............................. | 106/2 |
| 5,858,392 A | 1/1999 | Dumitriu et al. | |
| 6,107,372 A * | 8/2000 | Sakamaki ........................ | 524/56 |
| 6,269,858 B1 | 8/2001 | Sandstrom | |
| 2001/0025068 A1 | 9/2001 | Sandstrom | |
| 2003/0181557 A1* | 9/2003 | Suzuki et al. .................. | 524/334 |
| 2003/0186822 A1* | 10/2003 | Salaun et al. .................. | 508/216 |
| 2003/0212185 A1 | 11/2003 | Vasseur | |
| 2005/0038174 A1* | 2/2005 | Suzuki .......................... | 524/502 |
| 2005/0070703 A1* | 3/2005 | Muller et al. .................. | 536/123 |
| 2005/0098252 A1* | 5/2005 | Muraoka et al. ............... | 152/510 |
| 2006/0021688 A1* | 2/2006 | Sandstrom .................. | 152/209.4 |
| 2007/0225405 A1* | 9/2007 | Cegelski et al. ............... | 523/166 |
| 2009/0069474 A1* | 3/2009 | Sandstrom et al. ........... | 524/274 |

FOREIGN PATENT DOCUMENTS

| | | |
|---|---|---|
| EP | 0 501 227 B1 | 9/1992 |
| EP | 0 735 088 B1 | 10/1996 |
| EP | 0 810 258 B1 | 12/1997 |
| EP | 0 940 435 A1 | 9/1999 |
| EP | 1 074 582 B1 | 2/2001 |
| JP | 3-159803 A | 7/1991 |
| JP | 2002-211203 A | 7/2002 |
| JP | 2006206837 A * | 8/2006 |
| WO | WO 00/05300 A1 | 2/2000 |
| WO | WO 00/05301 A1 | 2/2000 |
| WO | WO 02/10269 A2 | 2/2002 |

OTHER PUBLICATIONS

Machine translation JP 2006206837 A, 2011.*
International Search Report (PCT/ISA/210) for PCT/EP2007/063397 dated Mar. 14, 2008.

* cited by examiner

*Primary Examiner* — Liam Heincer
(74) *Attorney, Agent, or Firm* — Buchanan Ingersoll & Rooney PC

(57) ABSTRACT

The invention relates to a tire tread having a composition based on at least one diene elastomer, one reinforcing filler and one vulcanization system, characterized in that the composition comprises a xanthan gum powder in a proportion of 10 to 40 pce.

The invention also relates to a process for obtaining a rubber composition for a tread based on at least one diene elastomer, one reinforcing filler and one vulcanization system which comprises a first phase of thermomechanical kneading of the constituents of the composition, with the exception of the vulcanization system, characterized in that the composition comprises a xanthan gum powder in a proportion of 10 to 40 pce and in that the xanthan gum powder is incorporated during the first kneading phase.

20 Claims, No Drawings

TYRE TREAD HAVING A COMPOSITION CONTAINING A XANTHAN GUM POWDER

The invention relates to rubber compositions for tyre treads and more particularly to rubber compositions which can be used in the treads of "winter" tyres, that is to say of tyres which are particularly effective on wet ground or ground covered with snow or melting ice, that is to say for temperatures of between −10° C. and 0° C., to preferably between −5° C. and 0° C.

Different solutions exist for making it possible to obtain good tyre grip, even on ground covered with snow or ice. Thus, studded tyres meet these criteria and make it possible to effectively resist sliding on ice; however, their very strong abrasive action on the ground surfacing itself is gradually resulting in them being banned.

Manufacturers have thus looked for other types of solutions consisting in modifying the rubber composition itself of tyre treads.

Some solutions consist, for example, in incorporating water-soluble powders in the constituent rubber mixture of the tread. Such powders dissolve on contact with snow or molten ice, which makes possible, on the one hand, the creation at the surface of the tyre tread of porosities capable of improving "the attachment" of the tread to the ground and, on the other hand, the creation of grooves acting as channels for discharge of the liquid film created between the tyre and the ground.

Thus, the publication JP-3-159803 describes tyre treads, the rubber composition of which comprises from 3 to 25 pce (pce meaning parts by weight per 100 parts of elastomers) of polysaccharide powder, such as sodium carboxymethylcellulose powder, or of vinyl alcohol powder with a particle size of between 20 and 600 μm and with a solubility at 0° C. of at least 5 g per 100 ml of water, which solubility is obtained on mixing for a few tens of seconds.

In the same way, the publication EP 0 940 435 describes a rubber composition for a tread comprising from 1 to 25 pce of modified polyvinyl alcohol with a particle size of between 10 and 100 μm and a solubility at 0° C. of 1 g per 200 ml of water for a very short mixing time, that is to say of the order of one minute.

Finally, the publication JP200211203 describes a rubber composition for a tread comprising from 3 to 40 pce of starch powder, the particles of which have a size of greater than or equal to 20 μm and a solubility of 1 g in 100 ml of water at 10° C., achieved after mixing for 3 minutes.

In all these examples, it is clear that the solubility at very low temperature and in a very short time of the powder used in the rubber composition is an essential factor in the satisfactory operation of the tread produced. This is because it is specified, in the abovementioned documents, that, if the powder is not soluble under the conditions of use of the tyre, an adhesive layer is no longer formed at the surface of the tread and that consequently the resistance to sliding is detrimentally affected. Unfortunately, this good performance with regard to grip is accompanied by very poor results in terms of wear resistance, which can be monitored by the deterioration in the rubber properties, such as stiffness, elongation and tensile strength properties, and hysteric losses, which render these solutions unusable industrially.

The Applicant Company has discovered, surprisingly, that the introduction into the constituent rubber composition of the tread of a specific polysaccharide powder which is insoluble in water in a very short time (of the order of one minute) and at very low temperature (of the order of 0°) nevertheless makes it possible to improve the behavior of the tyres in terms of resistance to sliding and of grip on snowy or frozen ground without the slight fall in wear resistance accompanying this modification having a prohibitory effect on the industrial use of such tyres.

In that which follows, tyre tread will denote the complete tread or a portion of the latter, in particular when it is composed of several layers, in contact with the ground.

The invention thus relates to a tyre tread having a rubber composition based on at least one diene elastomer, one reinforcing filler and one vulcanization system, characterized in that the composition comprises a xanthan gum powder in a proportion of 10 to 40 pce and preferably of 15 to 30 pce.

More particularly, the size of the particles of the xanthan gum powder is between 10 and 500 μm, preferably between 50 and 300 μm.

According to one characteristic of the invention, the xanthan gum powder is used as a blend with one or more other polysaccharide powders and in particular with a guar gum powder.

Advantageously, the diene elastomer is predominantly, for more than 50 pce, an isoprene elastomer.

According to one embodiment of the invention, the reinforcing filler predominantly comprises carbon black.

According to another embodiment, the reinforcing filler predominantly comprises silica or comprises a blend of carbon black and silica.

Another subject-matter of the invention is a process for obtaining a rubber composition for a tread based on at least one diene elastomer, one reinforcing filler and one vulcanization system which comprises a first phase of thermomechanical kneading of the constituents of the composition, with the exception of the vulcanization system, characterized in that the composition comprises a xanthan gum powder in a proportion of 10 to 40 pce, preferably of 10 to 30 pce, and in that the xanthan gum powder is incorporated during the first kneading phase.

Preferably, the first phase of the process is carried out in two stages: a first stage of kneading the combined constituents of the composition, with the exception of the xanthan gum powder, and a second stage in which the xanthan gum powder is incorporated.

According to one embodiment of the invention, the first stage of the first kneading phase is carried out at a temperature of between 110° C. and 190° C. and preferably between 130° C. and 180° C.; the second stage of the first kneading phase is carried out at a temperature of less than or equal to 130° C., after cooling on conclusion of the first stage, preferably to a temperature of less than or equal to 100° C.

Advantageously, the second phase of the process is carried out at a temperature of between 60° C. and 100° C.

A further subject-matter of the invention is a tyre comprising a tread, the rubber composition of which is based on at least one diene elastomer, one reinforcing filler and one vulcanization system, characterized in that the composition comprises a xanthan gum powder in a proportion of 10 to 40 pce, and particularly a winter tyre comprising such a tread.

A further subject-matter of the invention is a tyre intended to equip a "heavy-duty" vehicle (that is to say, underground, bus, heavy road transport vehicles (lorries, tractors, trailers) or off-road vehicles), planes, earthmoving equipment, heavy agricultural vehicles or handling vehicles, comprising a tread in accordance with the invention.

Finally, a subject-matter of the invention is a tyre intended to equip a passenger vehicle comprising a tread in accordance with the invention.

A person skilled in the art usually denotes by "polysaccharide gums" any polysaccharide or its derivatives which, dispersed in water, produce highly viscous gels or produce solutions.

Xanthan gum is included among polysaccharide gums; it involves dietary fibres "regarded" as thickeners and gelling agents which are insoluble in water; specifically, they form a gel on contact with water.

The rubber compositions according to the invention are based on the following constituents: at least one diene elastomer, one reinforcing filler and one crosslinking system.

The expression "composition based on" should be understood as meaning a composition comprising the mixture and/or the in situ reaction product of the various base constituents used, some of these constituents being able to react and/or being intended to react with one another, at least partially, during the various phases of manufacture of the composition or during the subsequent curing.

"Diene" elastomer or rubber is understood to mean, in a known way, an elastomer resulting at least in part (i.e., a homopolymer or copolymer) from diene monomers (monomers carrying two conjugated or nonconjugated carbon-carbon double bonds).

Generally, "essentially unsaturated" diene elastomer is understood here to mean a diene elastomer resulting at least in part from conjugated diene monomers having a level of units of diene origin (conjugated dienes) which is greater than 15% (mol %).

Thus it is, for example, that diene elastomers, such as butyl rubbers or copolymers of dienes and of α-olefins of EPDM (ethylene/propylene/diene terpolymer) type do not come within the preceding definition and can in particular be described as "essentially saturated" diene elastomers (low or very low level of units of diene origin, always less than 15%).

In the category of "essentially unsaturated" diene elastomers, "highly unsaturated" diene elastomer is understood to mean in particular a diene elastomer having a level of units of diene origin (conjugated dienes) which is greater than 50%.

Given these definitions, essentially unsaturated diene elastomer capable of being used in the compositions in accordance with the invention is understood in particular to mean:
  any homopolymer obtained by polymerization of a conjugated diene monomer having from 4 to 12 carbon atoms;
  any copolymer obtained by copolymerization of one or more conjugated dienes with one another or with one or more vinylaromatic compounds having from 8 to 20 carbon atoms.

The following are suitable in particular as conjugated dienes: 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta-, or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agents employed. The elastomers can, for example, be block, random, sequential or microsequential blocks and can be prepared in dispersion or in solution; they can be coupled and/or star-branched and also functionalized with a coupling and/or star-branching or functionalization agent.

The following are preferably suitable: polybutadienes, in particular those having a content of 1,2-units of between 4% and 80% or those having a content of cis-1,4-units of greater than 80%, polyisoprenes, butadiene/styrene copolymers and in particular those having a styrene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers, in particular those having an isoprene content of between 5% and 90% by weight and a glass transition temperature (Tg) of −40° C. to −80° C., or isoprene/styrene copolymers, in particular those having a styrene content of between 5% and 50% by weight and a Tg of between −25° C. and −50° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer having a Tg of between −20° C. and −70° C., are suitable in particular.

Particularly preferably, the diene elastomer of the composition in accordance with the invention is chosen from the group of the highly unsaturated diene elastomers consisting of polybutadienes (BR), polyisoprenes (IR) or natural rubber (NR), butadiene/styrene copolymers (SBR), butadiene/isoprene copolymers (BIR), isoprene/styrene copolymers (SIR), butadiene/acrylonitrile copolymers (NBR), isoprene/styrene copolymers (SIR), butadiene/styrene/isoprene copolymers (SBIR), butadiene/styrene/acrylonitrile copolymers (NSBR) or a mixture of two or more of these compounds.

According to another preferred embodiment, the diene elastomer is predominantly (for more than 50 pce) an isoprene elastomer. This is the case in particular when the compositions of the invention are intended to constitute, in the tyres, rubber matrices of certain treads (for example for industrial vehicles).

"Isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/styrene copolymers (SIR), isoprene/butadiene copolymers (BIR) or isoprene/butadiene/styrene copolymers (SBIR). This isoprene elastomer is preferably natural rubber or synthetic cis-1,4-polyisoprene; use is preferably made, among these synthetic polyisoprenes, of polyisoprenes having a level (mol %) of cis-1,4-bonds of greater than 90%, more preferably still of greater than 98%.

Nevertheless, such diene polymers can be used alone or as a blend with other elastomers conventionally used in tyres, such as essentially saturated diene elastomers, such as,
  a ternary copolymer obtained by copolymerization of ethylene and of an α-olefin having from 3 to 6 carbon atoms with a nonconjugated diene monomer having from 6 to 12 carbon atoms, such as, for example, elastomers obtained from ethylene and propylene with a nonconjugated diene monomer of the abovementioned type, such as in particular 1,4-hexadiene, ethylidenenorbornene or dicyclopentadiene;

a copolymer of isobutene and of isoprene (butyl rubber or IIR) and the halogenated, in particular chlorinated or brominated (BIIR), versions of this type of copolymer;

or a copolymer of isobutene and of para-methylstyrene and the halogenated, in particular chlorinated or brominated (BIMS), versions of this type of copolymer.

Use may in particular be made, as reinforcing filler, of carbon black or silica or other reinforcing fillers, alone or as a blend with one another.

More particularly, all carbon blacks, in particular blacks of the HAF, ISAF or SAF type, conventionally used in tyres and particularly in tyre treads are suitable as carbon blacks. Mention may be made, as nonlimiting examples of such blacks, of the N115, N134, N234, N330, N339, N347 or N375 blacks.

In the case of a silica, use is preferably made of a highly dispersible precipitated silica, in particular when the invention is made use of in the manufacture of tyres exhibiting a low rolling resistance; mention may be made, as nonlimiting examples of such preferred highly dispersible silicas, of the Ultrasil 7000 and Ultrasil 7005 silicas from Degussa, the Zeosil 1165 MP, 1135 MP and Il15 MP silicas from Rhodia, the Hi-Sil EZ150G silica from PPG, the Zeopol 8715, 8745 and 8755 silicas from Huber or treated precipitated silicas, such as, for example, the silicas "doped" with aluminum described in the abovementioned Application EP-A-0 735 088.

The vulcanization system proper is preferably based on sulphur and on a primary vulcanization accelerator, in particular on an accelerator of the sulphonamide type. Additional to this base vulcanization system are various known vulcanization activators or secondary accelerators, such as zinc oxide, stearic acid, guanidine derivatives (in particular diphenylguanidine), and the like. The sulphur is used at a preferred level of between 0.5 and 10 pce, more preferably of between 0.5 and 5.0 pce, for example between 0.5 and 3.0 pce, when the invention is applied to a tyre tread. The primary vulcanization accelerator is used at a preferred level of between 0.5 and 10 pce, more preferably of between 0.5 and 5.0 pce, in particular when the invention is applied to a tyre tread.

It is obvious that the invention relates to the rubber compositions described above both in the "raw" state (i.e., before curing) and in the "cured" or vulcanized state (i.e., after crosslinking or vulcanization).

Of course, the compositions in accordance with the invention can be used alone or as a blend (i.e., as a mixture) with any other rubber composition which can be used for the manufacture of tyres. The rubber compositions in accordance with the invention can also comprise all or a portion of the usual additives generally used in elastomer compositions intended for the manufacture of tyres, such as, for example, plasticizers or extending oils, whether the latter are aromatic or nonaromatic in nature, pigments, protection agents, such as antiozone waxes, chemical antiozonants, antioxidants, antifatigue agents, reinforcing resins, methylene acceptors (for example, phenolic novolak resin) or methylene donors (for example HMT or H3M), as described, for example, in Application WO 02/10269 (or US2003/0212185).

The examples which follow illustrate the invention without, however, limiting it.

In the examples, the rubber compositions are characterized after curing as indicated below.

Hysteretic Losses:

These losses, denoted P60°, are measured at 60° C. in percentage. The strain for the losses measured is 35%.

Tensile Strengths and Elongations at Break:

The tensile strengths (in MPa) and elongations at break (in %) are measured at 60° C.

Dynamic Properties:

The dynamic properties $G^*$ and $\tan(\delta)_{max}$ are measured on a viscosity analyzer (Metravib VA4000) according to Standard ASTM D 5992-96. The response of a sample of vulcanized composition (cylindrical test specimen with a thickness of 2 mm and with a cross section of 78.5 $mm^2$), subjected to a simple alternating sinusoidal shear stress, at a frequency of 10 Hz, under the standard temperature conditions according to Standard ASTM D 1349-99, is recorded. A peak-to-peak strain amplitude sweep is carried out from 0.1% to 50% (outward cycle) and then from 50% to 1% (return cycle). The results made use of are the complex dynamic shear modulus ($G^*$) and the loss factor, $\tan(\delta)$. The maximum value of $\tan(\delta)$ observed ($\tan(\delta)_{max}$) is shown for the return cycle.

In the examples which follow, the rubber compositions were prepared as follows.

The compositions are manufactured in appropriate mixers using two successive preparation phases well known to a person skilled in the art: a first phase of thermomechanical working or kneading (sometimes described as "nonproductive" phase) at high temperature, up to a maximum temperature (denoted $T_{max}$) of between 110° C. and 190° C., preferably between 130° C. and 180° C., followed by a second phase of mechanical working (sometimes described as "productive" phase) at a lower temperature, typically of less than 110° C., for example between 60° C. and 100° C., finishing phase during which the crosslinking or vulcanization system is incorporated; such phases have been described, for example, in the abovementioned Applications EP-A-0 501 227, EP-A-0 735 088, EP-A-0 810 258, WO 00/05300 or WO 00/05301.

In the process in accordance with the invention, the first (nonproductive) phase is carried out in two thermomechanical stages. During the first stage, all the necessary base constituents, the optional additional covering agents or processing aids and various other additives, with the exception of the vulcanization system, are introduced into an appropriate mixer, such as a normal internal mixer. This first stage is carried out at a temperature of between 110° C. and 190° C. and preferably between 130° C. and 180° C. The second stage of thermomechanical working is carried out in this internal mixer, after intermediate cooling (cooling temperature preferably of less than 100° C.), in order to introduce the polysaccharide powders and also with the aim of subjecting the compositions to an additional heat treatment and in particular in order to further improve the dispersion, in the elastomeric matrix, of the reinforcing filler. The total duration of the kneading, in this nonproductive phase, is preferably between 2 and 10 minutes at a temperature of less than or equal to 130° C., in order to avoid any damage to the polymer.

After cooling the mixture thus obtained, the vulcanization system is then incorporated at low temperature, generally in an external mixer, such as an open mill; the combined mixture is then mixed (productive phase) for a few minutes, for example between 5 and 15 minutes.

The final composition thus obtained is subsequently calendered, for example in the form of a sheet or of a plaque, in particular for laboratory characterization, or else extruded, for example to form a rubber profiled element used for the manufacture of semifinished products, such as treads.

The vulcanization (or curing) is carried out in a known way at a temperature generally of between 130° C. and 200° C., under pressure, for a sufficient time which can vary, for example, between 5 and 90 minutes, depending in particular on the curing temperature, the vulcanization system adopted, the kinetics of vulcanization of the composition under consideration or the size of the tyre.

EXAMPLE 1

The aim of this example is to show the superiority of a tread in accordance with the invention in comparison with a control tread in a starting situation on ice of a tyre, with a temperature of between −5° C. and 0° C.

The control tread is produced from a control composition A1 and the tread in accordance with the invention is produced from a composition A2 in accordance with the invention, that is to say comprising a xanthan gum powder in proportions and for a particle size corresponding to the invention.

The compositions A1 and A2 have one and the same base formulation A. This base formulation A is as follows:

| | |
|---|---|
| NR (1) | 80 |
| BR (2) | 20 |
| Carbon black N234 | 53 |
| Paraffin | 1 |
| Antioxidant (3) | 3 |
| Stearic acid | 2 |
| ZnO | 3 |
| Sulphur | 1.1 |
| Accelerator (4) | 1.1 |

(1) NR: natural rubber (peptized)
(2) BR: polybutadiene with 4.3% of 1,2-; 2.7% of trans-1,4-; 93% of cis-1,4- (Tg = −106° C.)
(3) N-(1,3-dimethylbutyl)-N-phenyl-para-phenylenediamine (6-PPD)
(4) N-cyclohexyl-2-benzothiazolesulphenamide (CBS)

The specific characteristics of the compositions A1 and A2 are given in the following Table 1.

TABLE 1

| Composition No. | A1 | A2 |
|---|---|---|
| Xanthan gum (5) | — | 20 |

(5) Xanthan gum: Rhodopol 23, Rhodia (particle size: 106 μm)

Preparation of the Compositions

The composition A1 is manufactured with introduction of all of the constituents onto an internal mixer, with the exception of the vulcanization agents (sulphur and accelerator), which are introduced onto an external mixer at low temperature (the constituent rollers of the mixer being at approximately 30° C.).

The composition A2 is manufactured in accordance with the process of the invention, with introduction, during the first stage of the nonproductive phase, of the constituents onto an internal mixer, with the exception of the xanthan gum, the said xanthan gum being introduced during the second stage onto the internal mixer with a temperature not exceeding 130° C. in order not to damage the polysaccharide powder. The vulcanization system is subsequently introduced, during the second "productive" phase, onto an external mixer.

The treads corresponding to the compositions A1 and A2 are subsequently manufactured in accordance with the process described above in the description.

Tests

The tests were carried out on a tyre with dimensions 11R22.5 XDW "ICE GRIP" fitted to a 7.5*22.5 wheel of a "Scania SV81" lorry for the starting tests and of an "SV79 TDH" lorry for the braking tests.

The measurements were carried out in the following way:
for the starting: the distance traveled during the first two seconds following starting is measured, starting being carried out with a remotely set constant engine speed and the sudden application of an engine torque and maintenance of this torque.

The measurements are carried out for the unladen vehicle and for the loaded vehicle, that is to say with a nominal load.
for the braking: stopping distance of the lorry from a stabilized speed of 30 km/h with ABS braking.

The results obtained are given in the following Table 2.

TABLE 2

| Tyre with tread having composition No. | A1 | A2 |
|---|---|---|
| Starting, ice, between −5° C. and 0° C., unladen | 100 | 108 |
| Starting, ice, between −5° C. and 0° C., loaded | 100 | 105 |
| Starting, snow, unladen | 100 | 120 |

It is clearly apparent that the tyre corresponding to the tread composition A2 in accordance with the invention makes it possible to significantly improve the grip of the tyre on frozen ground.

EXAMPLE 2

The object of this example is to compare the stiffness properties, tensile strength properties, elongation at break properties, and the like, of several rubber compositions in accordance with the invention with those of a tread composition in accordance with the abovementioned state of the art, that is to say comprising a water-soluble powder, such as carboxymethylcellulose or polyvinyl alcohol, PVA.

The compositions were produced according to the procedure described in Example 1 for A2, A2 being identical to the composition of the same name in Example 1.

A1 the compositions denoted A2, E(PVA) and F(Carbo) have the base formulation A specified in Example 1; they differ from one another in their content of xanthan gum or water-soluble powder as follows:

A2 comprises 20 pce of xanthan gum, Rhodopol 23, Rhodia (particle size: 106 μm)

E(PVA): 20 pce of PVA sold under the name Mowiol 4-88 by Aldrich, PVA 86.7-88.7 mol % hydrolysed, degree of polymerization 630, viscosity at 4% in $H_2O$ at 20° C. 3-5 mPa·s (particle size: 500 μm)

F(Carbo): 20 pce of carboxymethylcellulose, sodium salt, originating from Fluka (No. 21903), characterized by a viscosity in solution of 700-1500 mPa·s (at 1% in $H_2O$, at 25° C.) and by a degree of substitution of 0.7-0.85, (particle size: 89 μm).

Table 3 gives the properties measured after curing at 150° C. for 25 minutes.

TABLE 3

| Composition No. | A2 | E (PVA) | F (Carbo) |
|---|---|---|---|
| Elongation at break (%) | 488 | 339.6 | 404.4 |
| Tensile strength (MPa) | 16 | 9.9 | 13.9 |
| G* | 1.77 | 1.96 | 1.92 |
| $Tan(\delta)_{max}$ | 0.195 | 0.214 | 0.212 |

It is found that the compositions A2 in accordance with the invention exhibit a much better compromise in mechanical reinforcement without a major damaging affect on the hysteresis of the material than the mixtures comprising polyvinyl alcohol, E(PVA), or carboxymethylcellulose, F(Carbo).

This example thus allows us to illustrate the improvement in rubber properties of the compositions in accordance with the invention in comparison with the compositions described in the prior art and consequently the improvement in the wear resistance of the compositions in accordance with the invention in comparison with these compositions of the prior art. In point of fact, it is precisely this decline in the wear resistance for the compositions of the prior art which, as was stated at the beginning of the description, rendered them unusable industrially.

EXAMPLE 3

The aim, identically to Example 1, of this example is to compare the different rubber properties of a control diene tread composition not including polysaccharide or water-soluble powder with tread compositions in accordance with the invention, that is to say comprising a xanthan gum powder. The two compositions with the base formulation B exhibit a blend of natural rubber and of synthetic rubber different from that of Example 1.

This base formulation B is as follows:

| | |
|---|---|
| NR (1) | 40 |
| BR (2) | 60 |
| Silica (3) | 80 |
| Carbon black N234 | 5 |
| Aromatic oil | 65 |
| Antiozone wax | 1.5 |
| Coupling agent (4) | 5 |
| Antioxidant (5) | 2 |
| Stearic acid | 1 |
| ZnO | 1.5 |
| DPG (6) | 1.5 |
| Sulphur | 2 |
| Accelerator (7) | 1.5 |

(1) NR: natural rubber (peptized)
(2) BR: polybutadiene with 4.3% of 1,2-; 2.7% of trans-1,4-; 93% of cis-1,4- (Tg=−106° C.)
(3) Silica "Zeosil 1165Mp" from Rhodia, type "HDS"
(4) Coupling agent: TESPT ("Si69" from Degussa)
(5) Antioxidant: N-(1,3-dimethylbutyl)-N-phenyl-para-phenylenediamine (6-PPD)
(6) DPG: diphenylguanidine (Perkacit DPG from Flexys)
(7) Accelerator: N-cyclohexyl-2-benzothiazolesulphenamide (CBS)

The specific characteristics of the compositions B1 and B2 are given in the following Table 4:

TABLE 4

| Composition No. | B1 | B2 |
|---|---|---|
| Xanthan gum (8) | — | 20 |

(8) Xanthan gum: Rhodopol 23, Rhodia

The first kneading phase of the process ("nonproductive" phase) is carried out in a mixing vessel. The main ingredients (elastomer, silica, oil and chemical additives) are introduced therein.

The vulcanization system is introduced in a finishing phase of the process ("productive" phase) carried out on an open mill.

Table 5 gives the properties measured after curing at 150° C. for 40 minutes.

TABLE 5

| Composition No. | B1 | B2 |
|---|---|---|
| Elongation at break (%) | 700 | 600 |
| Tensile strength (MPa) | 17 | 12 |
| P60° | 21 | 19 |

It is found that the composition B2 in accordance with the invention, comprising a xanthan gum, has rubber properties in terms of elongation at break and of tensile strength which have deteriorated in comparison with the control composition; however, this deterioration is not of a prohibitory nature for a person skilled in the art. Furthermore, a reduction in the hysteric losses is very surprisingly observed for B2 in comparison with the control composition B1, which signifies an improvement in the rolling resistance in a tyre tread application.

Thus, on the one hand, the foreseeable deterioration in the rubber properties in terms of elongation at break and tensile strength, due to the introduction of xanthan gum into the composition in accordance with the invention, remains acceptable to a person skilled in the art and, on the other hand, he observes an improvement with regard to the hysteresis properties.

EXAMPLE 4

The aim of this example is to demonstrate the superiority of a tread in accordance with the invention in comparison with a control tread in a starting situation on ice of a tyre with a temperature of between −5° C. and 0° C. for treads manufactured in accordance with the process described in detail in the description with the control rubber composition B1 and the rubber composition B2 in accordance with the invention, which are identical to those of the preceding Example 3.

These compositions B1 and B2 were used for the manufacture of tyre treads with dimensions of 205/55R16 of the "Michelin X Ice" brand fitted to a "Toyota Pronar" vehicle having an antilock braking system (ABS) and a traction control system (TCS).

Running tests were carried out on ice, during which different types of icy tracks and temperature conditions were tested.

Braking Tests:

The results obtained after longitudinal braking (distance traveled in order to decelerate from 20 to 5 km/h) are indexed with respect to the braking distance of the control tyre. The braking tests are carried out on a sheltered ice track.

The braking performance index of the "test" tyres is obtained by the following formula:

$$PIBraking=(Braking\ distance\ of\ the\ control/Braking\ distance\ of\ the\ test\ tyre)*100.$$

Starting Test:

The results obtained after the starting test (active traction control system) correspond to the time necessary in order to accelerate from 5 to 20 km/h at full engine speed under control of the TCE system.

The ice acceleration tests are carried out on a covered track.

The performance index for the starting of the "test" tyres is obtained by the following formula:

$$PIStarting=(Starting\ time\ of\ the\ control/Acceleration\ time\ of\ the\ test\ tyre)*100.$$

The results obtained are given in the following Table 6:

TABLE 6

| Tyre with tread having composition No. | B1 | B2 |
|---|---|---|
| Braking, ice (−3° C.) | 100 | 111 |
| Braking, ice (−8° C.) | 100 | 104 |
| Starting, ice (−3° C.) | 100 | 103 |
| Starting, ice (−8° C.) | 100 | 105 |

It is clearly apparent that the tyre corresponding to the tread composition B2 in accordance with the invention makes it possible to significantly improve the grip of the tyre on frozen ground.

The invention claimed is:

1. A tire tread having a composition based on at least one diene elastomer, one reinforcing filler and one vulcanization system, wherein the composition comprises a xanthan gum powder in a proportion of 15 to 40 parts by weight per hundred parts of elastomer (pce).

2. Tread according to claim 1, in which the proportion of xanthan gum incorporated is between 15 and 30 pce.

3. Tread according to claim 1, in which the size of the constituent particles of the xanthan gum powder is between 10 and 500 μm.

4. Tread according to claim 1, in which the size of the constituent particles of the xanthan gum powder is between 50 and 300 μm.

5. Tread according to claim 1, in which the xanthan gum powder is used as a blend with one or more other polysaccharide powders.

6. Tread according to claim 5, in which the xanthan gum powder is used as a blend with a guar gum powder.

7. Tread according to claim 1, in which the diene elastomer comprises more than 50 pce of an isoprene elastomer.

8. Tread according to claim 1, in which the reinforcing filler comprises carbon black.

9. Tread according to claim 1, in which the reinforcing filler comprises silica.

10. Tread according to claim 1, in which the reinforcing filler comprises a blend of carbon black and silica.

11. Tyre comprising a tread according to claim 1.

12. Winter tyre comprising a tread according to claim 1.

13. Tyre intended to equip heavy-duty vehicles comprising a tread according to claim 1.

14. Tyre intended to equip passenger vehicles comprising a tread according to claim 1.

15. Process for obtaining a rubber composition for a tread based on at least one diene elastomer, one reinforcing filler and one vulcanization system which comprises a first phase of thermomechanical kneading of the constituents of the composition, with the exception of the vulcanization system, wherein the first phase comprises a first stage of kneading the constituents of the composition with the exception of xanthan gum powder at a temperature of between 110° C. and 190° C., and a second stage of kneading the constituents in which the xanthan gum powder is incorporated, wherein the composition comprises a xanthan gum powder in a proportion of 15 to 40.

16. Process according to claim 15, in which the proportion of xanthan gum incorporated is between 15 and 30 pce.

17. Process according to claim 15, in which the first stage of the first kneading phase is carried out at a temperature of between 130° C. and 180° C.

18. Process according to claim 15, in which the second stage of the first kneading phase is carried out at a temperature of less than or equal to 130° C., after cooling on conclusion of the first stage.

19. Process according to claim 18, in which the cooling between the first and the second stages of the first kneading phase is carried out to a temperature of less than or equal to 100° C.

20. Process according to claim 15, in which the second phase of the process is carried out at a temperature of between 60° C. and 100° C.

* * * * *